United States Patent [19]

Williams

[11] Patent Number: 5,430,790

[45] Date of Patent: Jul. 4, 1995

[54] CALL DELIVERY SERVICE WITHIN A RADIOTELEPHONE COMMUNICATION SYSTEM

[75] Inventor: James M. Williams, Lombard, Ill.

[73] Assignee: Motorola, Inc., Schaumburg, Ill.

[21] Appl. No.: 318,169

[22] Filed: Jun. 13, 1994

Related U.S. Application Data

[63] Continuation of Ser. No. 725,180, Jul. 3, 1991, abandoned.

[51] Int. Cl.$^6$ ............... H04Q 7/22; H04M 11/00
[52] U.S. Cl. ................. 379/63; 379/59; 379/60; 455/33.1
[58] Field of Search ............ 379/58, 59, 60, 63; 455/33.1, 33.2

[56] References Cited

U.S. PATENT DOCUMENTS

| | | | |
|---|---|---|---|
| 4,833,701 | 5/1989 | Comcoe et al. | 455/33.2 |
| 4,901,340 | 2/1990 | Parker et al. | 379/60 |
| 5,090,050 | 2/1992 | Heffernan | 379/59 |
| 5,090,051 | 2/1992 | Muppidi et al. | 379/63 |

FOREIGN PATENT DOCUMENTS

| | | | |
|---|---|---|---|
| 3507058 | 9/1986 | Germany | 379/60 |
| 2193861 | 2/1988 | United Kingdom | 379/58 |
| 9117620 | 11/1991 | WIPO | 379/60 |

OTHER PUBLICATIONS

EIA/TIA Interim Standard—Cellular Radiotelecommunications Intersystem Operations: Automatic Roaming-EIA/TIA/IS-41.3-A-Jan. 1991.

Primary Examiner—Curtis Kuntz
Assistant Examiner—G. J. Oehling
Attorney, Agent, or Firm—Val Jean F. Hillman

[57] ABSTRACT

The present invention relates to a method and apparatus for enabling RT subscribers (15, 25 and 35), in radio service areas (1, 2 and 3) serviced by a radio telephone control system (11, 21 and 31) (RTCS), to receive calls originally presented to non-servicing RTCSs (11, 21 or 31). In this effort the RTCS (11) currently serving the RT subscriber (15) receives information and a callback number indicating that a call, placed to the RT subscriber (15), is in progress at a remote RTCS (21 or 31). In response, the currently serving RTCS (11) pages the RT subscriber (15). Thereafter, upon receipt of the RT subscriber's page response, the currently serving RTCS (11) calls the callback number so as to connect the RT subscriber (15) to the call in progress.

6 Claims, 3 Drawing Sheets

CALL DELIVERY SERVICE WITHIN A RADIOTELEPHONE COMMUNICATION SYSTEM

This is a continuation of application Ser. No. 07/725,180, filed Jul. 3, 1991 and now abandoned.

FIELD OF THE INVENTION

The present invention relates generally to service capabilities offered within a radiotelephone communication network. More particularly, the present invention relates to a method for expanding those service capabilities, by enabling a radiotelephone (RT) subscriber operating in any of the radio service areas served by the network to receive calls placed to him and which first appear in the network at any allowable access point.

BACKGROUND OF THE INVENTION

Radiotelephone communications is one of the fastest growing services currently offered by the telecommunications industry. The underlying technology which supports such services is well documented and well within the knowledge and understanding of those skilled in the art. For a more detailed discussion, the interested reader may refer to the following publications, each of which is incorporated herein by reference:

EIA/TIA Interim Standard IS-41-A: "Cellular Radiotelecommunications Intersystem Operations" January 1991;

EIA/TIA Interim Standard IS-54: "Cellular System Dual-Mode Mobile Station—Base Station Compatibility Standard" May 1990;

EIA/TIA Standard EIA/TIA-553: "Mobile Station—Land Station Compatibility Standard" September 1989; and U.S. Pat. No. 4,901,340-Parker Et. Al. "System for the Extended Provision of Cellular Mobile Radiotelephone Service."

One of the attractive features of radiotelephone (RT) service is that it affords the RT subscriber more convenient access to and from the public switched telephone network (PSTN). Consequently, RT subscribers are accustomed to placing and receiving telephone calls, without the need for, or availability of PSTN telephones. The advent of portable RT units has only operated to further increase RT subscriber accessibility.

Unfortunately, certain features of currently existing radiotelephone communication systems are at direct odds with this trend towards greater accessibility. Heretofore, an RT subscriber's ability to receive incoming calls has been severely restricted when the subscriber is not physically present within a specified geographic area. For example, calls placed to a subscriber's phone number will frequently be answered by a message indicating that the subscriber cannot be found. This is often the case when the subscriber is "roaming". By definition, a subscriber using or attempting to use his radiotelephone in a service area different from his designated "home" area is said to be "roaming" and may therefore be considered a "roamer".

In a typical configuration of multiple, non-networked RT systems, in order for a roaming RT subscriber to receive incoming calls, would-be callers need to know in which geographic area the subscriber is physically present and the procedures for accessing the subscriber through the facilities of that geographic area's servicing system. Such systems typically have a ten digit roaming access number. Areas in which service is provided by both wire line and non-wire line carriers have at least two such access numbers, corresponding to the wire line and the non-wire line carrier, respectively.

Armed with the appropriate access number, the would-be caller must first dial the ten digit access number of the system serving the area he expects the subscriber to be within, followed by the RT subscriber's phone number. This ofttimes awkward method can be further complicated by the dialing of incorrect access numbers, the subscriber having to prearrange delivery of incoming calls, subscriber absenteeisms, not to mention the steps required to satisfy various billing arrangements.

Since roaming is a condition unique to, yet frequently experienced by the average RT subscriber, demand dictates that improved service be offered this expanding sector of the RT subscriber population. It would be extremely advantageous therefore to provide a method for continuous RT subscriber accessibility, regardless of geographic location within a servicing RTN.

This problem has been the subject of substantial activity by committees of industry experts and by private companies over a number of years culminating in the specification of various schemes for "knitting together" multiple individual RT systems into a complete RT Network (RTN) within which RT subscribers may receive their normal services automatically regardless of their actual physical location within the RTN. For example, the reference EIA/TIA Interim Standard IS-41-A: "Cellular Radiotelecommunications Intersystem Operations" provides an example of a public standard, while U.S. Pat. No. 4,901,340-Parker et. al. offers a proprietary solution for networked RT systems.

A major issue in the overall RTN solution has been the problem of how to establish a connection through the PSTN between the RTN element where an incoming call to a RT subscriber first appears in the RTN and the element then controlling the radio service area in which the RT subscriber is operating. Both the above cited references specify a technique employing a "Temporary Directory Number" (TDN) assigned by the current serving RTN element to establish the desired connection. The present invention takes a different approach to establishing the same connection.

SUMMARY OF THE INVENTION

Briefly described, the present invention is a method for enabling an RT subscriber, in a radio service area controlled by a radio telephone control system (RTCS), to receive calls which entered the RTN at a non-serving "originating" RTCS. In this method, the currently serving RTCS is adapted to receive information and a callback number indicating that a call, placed to the RT subscriber is in progress at a non-serving RTCS. In response, the currently serving RTCS pages the RT subscriber and calls the callback number so as to connect the RT subscriber to the in progress call.

It is a first advantage of the present invention, that the callback number is provided by the originating RTCS.

It is yet another advantage of the present invention, that the callback number may not be called unless and until receipt of the RT subscriber's page response is verified, thus saving unnecessary utilization of PSTN circuits.

DESCRIPTION OF A PREFERRED EMBODIMENT

Figure 1:
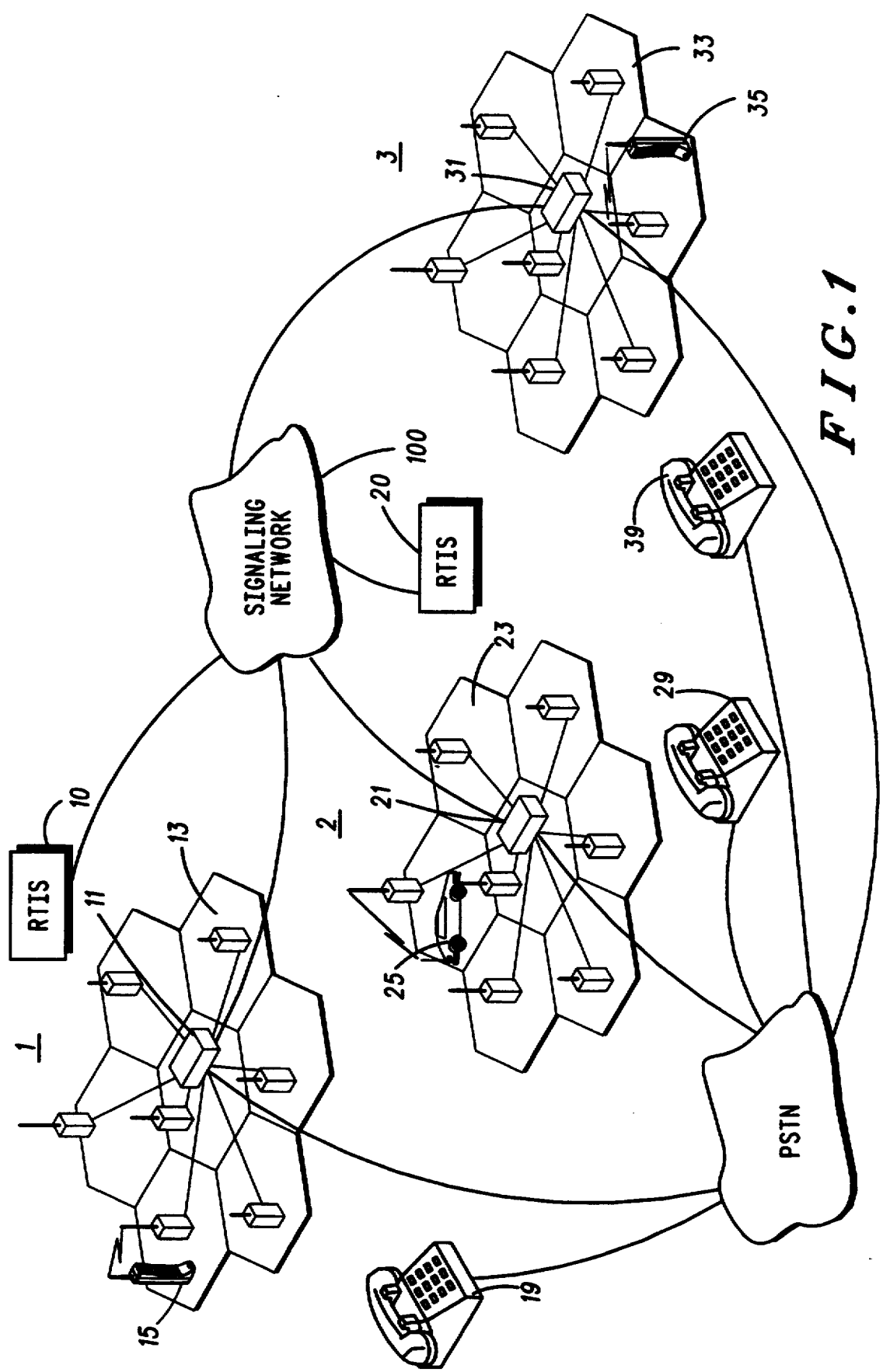
FIG. 1 is a system diagram of a cellular radio telephone network.

FIG. 1 is a system diagram of a cellular RTN consisting of cellular radio service areas 1, 2 and 3, interconnected via a signalling network 100 and the public switched telephone network (PSTN). As is conventional each radio service area is controlled by a radio telephone control system (RTCS) or switch 11, 21 and 31, surrounded by a plurality of cell sites 13, 23 and 33, each equipped with one or more RF transceivers sites 17, 27 and 37. During operation, the RT subscribers 15, 25 and 35 establish RF communications with the cell sites. Each cell site, in turn, couples to a servicing RTCS via dedicated facilities. The RTCSs then couple together via the signalling network 100 and to the PSTN.

A complete description of the fixed and mobile hardware and software necessary to implement the RTN of FIG. 1 is well documented and well within the knowledge of those skilled in the art and will not, therefore, be provided at this time. Interested readers may, however, refer to "DYNA T.A.C. TM Systems description." Instructional Manual 68P81150E01-A, available from Motorola Inc., Technical Writing Services, 1301E. Algonquin Rd, Schaumburg Ill., 60196, hereby incorporated by reference.

Suffice it to say, however that each RTCS comprises a software-driven, computer-controlled telephone switch that performs functions including but not limited to:

providing communication and signalling connections between the RTCS and the PSTN, providing signalling data communication connections with other elements of the RTN, via the signalling network, providing communication and signalling connections between the RTCS and RT subscribers (commonly referred to as the Air Interface), via the RF means providing switched communications services to RT subscribers, including roamers, served by the RTCS, administering the usage of RF channels available to the associated radio service area, providing control over the "hand-off" of calls between cells, and recording billing information.

An example of a RTCS that has been used in connection with existing RTNs is the EMX 2500, available from Motorola, Inc. Literature describing this device has in the past been available at the above-provided address.

In addition, each RT subscriber is associated with a data base or radio telephone information store (RTIS), depicted as 10 and 20. An RTIS functions to maintain and update RT subscriber information such as, but not limited to, identification numbers, authentication information, service features, service feature status, privileges, restrictions, and servicing RTCS ID, for a number of RT subscribers.

It is worth noting that the RTISs, of FIG. 1 are depicted as separate RTN elements. It will nonetheless be appreciated by those skilled in the art that RTIS functions and RTCS functions may be incorporated into a single physical entity.

By way of example, lets assume that RT subscriber 15 purchased RT service for radio service area 1 and is recorded as a valid subscriber in RTIS 10. As is conventional, RT subscriber 15 is assigned a permanent phone number which allows him to receive incoming calls. This number consists, for example, of a Numbering Plan Area (NPA) code, such as, 312, which identifies the NPA containing radio service area 1, an office code, 456, which is associated with an RTCS within the NPA, and a station ID, for example, 1234. Thus, in order to contact RT subscriber 15, would be callers must dial 312-456-1234. As long as RT subscriber 15 remains within radio service area 1, incoming calls can be received in this manner.

A major attribute of mobile RT subscribers, is the ability to roam. As previously discussed, roaming subscribers present current RTN operators with the unique challenge of tracking and maintaining RT service, despite changes in location. Heretofore, the brunt of this responsibility has rested upon the would-be caller, whose responsibility it was to retain current information about the RT subscriber's possible location, and the appropriate access codes which made the roaming subscriber accessible. In response to increased demands, however, the present invention is compatible with methods directed towards providing automatic RT subscriber accessibility, regardless of the RT subscriber's geographic location within the RTN.

Figure 2:
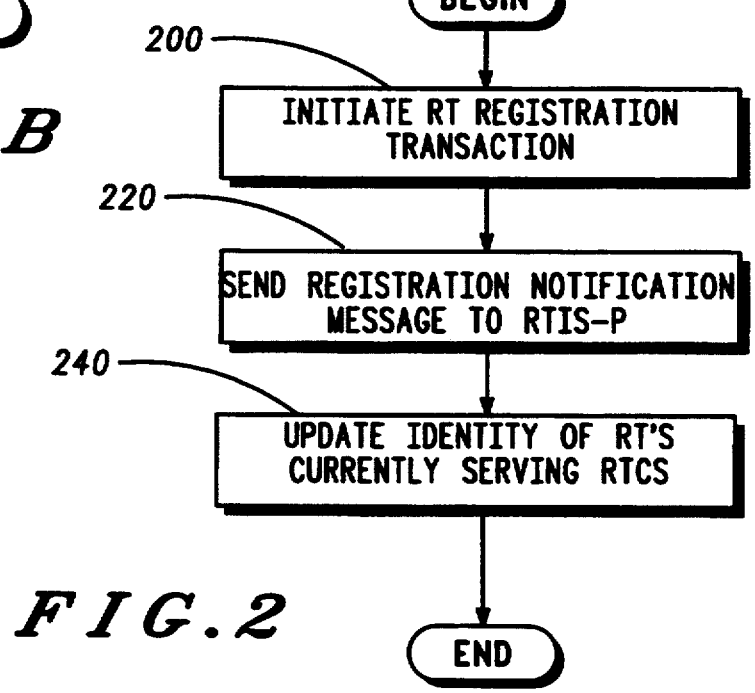
FIG. 2 is a flow chart diagram depicting the registration operation of the present invention.

With this as background, we can now direct our attention to FIG. 2, which is a flow chart diagram depicting the steps involved in registering an RT subscriber upon arrival into a new radio service area. The flow chart begins at block 200, whenever an RT subscriber enters a new radio service area. As is conventional, the RT subscribers must first register with the currently servicing RTCS. The typical registration process is well documented and well within the knowledge and understanding of those skilled in the art. Still, the interested reader may refer to the Electronic Industry Association/Telecommunications Industry Association EIA/TIA Interim Standard, EIA/TIA/IS-41.3-A entitled "Cellular Radiotelecommunications Intersystem Operations: Automatic Roaming", January, 1991, pgs. 6 and 7, and to the Electronic Industries Association/Telecommunications Industry Association Standard EIA/TAI-553 entitled "Mobile Station - Land Station Compatibility Standard", September, 1989, pgs. 2-11 through 2-22. In the past these documents have been available by contacting the ELECTRONIC INDUSTRIES ASSOCIATION Engineering Department, 2001 Pennsylvania Avenue N.W. Washington, D.C. 20006.

The typical RT subscriber registration transaction is initiated by the RT subscriber informing the currently servicing RTCS (RTCS-S) of its presence. This may be either a manual or automatic operation, where the RT subscriber presents to the RTCS-S a registration request, which contains in part, the RT's identification number (RTID). Thereafter, at block 220, the RTCS-S sends a registration notification request to the RTIS which permanently maintains that RT subscriber's service record (RTIS-P). This association is achieved, at least in part, via the use of RTID.

Upon receipt of a registration notification request, the RTIS-P performs various tasks, such as, but not limited to sending a registration cancellations to previously visited RTCSs, and transferring to the new RTCS-S, the RT subscriber's service record along with applicable validation indications.

From block 220, flow proceeds to block 240 where the RTIS-P updates its service record entry for the roaming RT to include additional information such as, but not limited to the identification of the currently servicing RTCS. At this point, the registration process is complete.

For the remainder of this discussion, lets assume that the RT subscriber 25, whose phone number is 212-888-4567, has temporarily relocated to radio service area 1, and registered therein, as described above. In addition, we shall assume that RTIS 20, which is the RTIS-P for the RT subscriber 25, has performed a service record update for RT subscriber 25, as described in association with block 240.

Figure 3B:
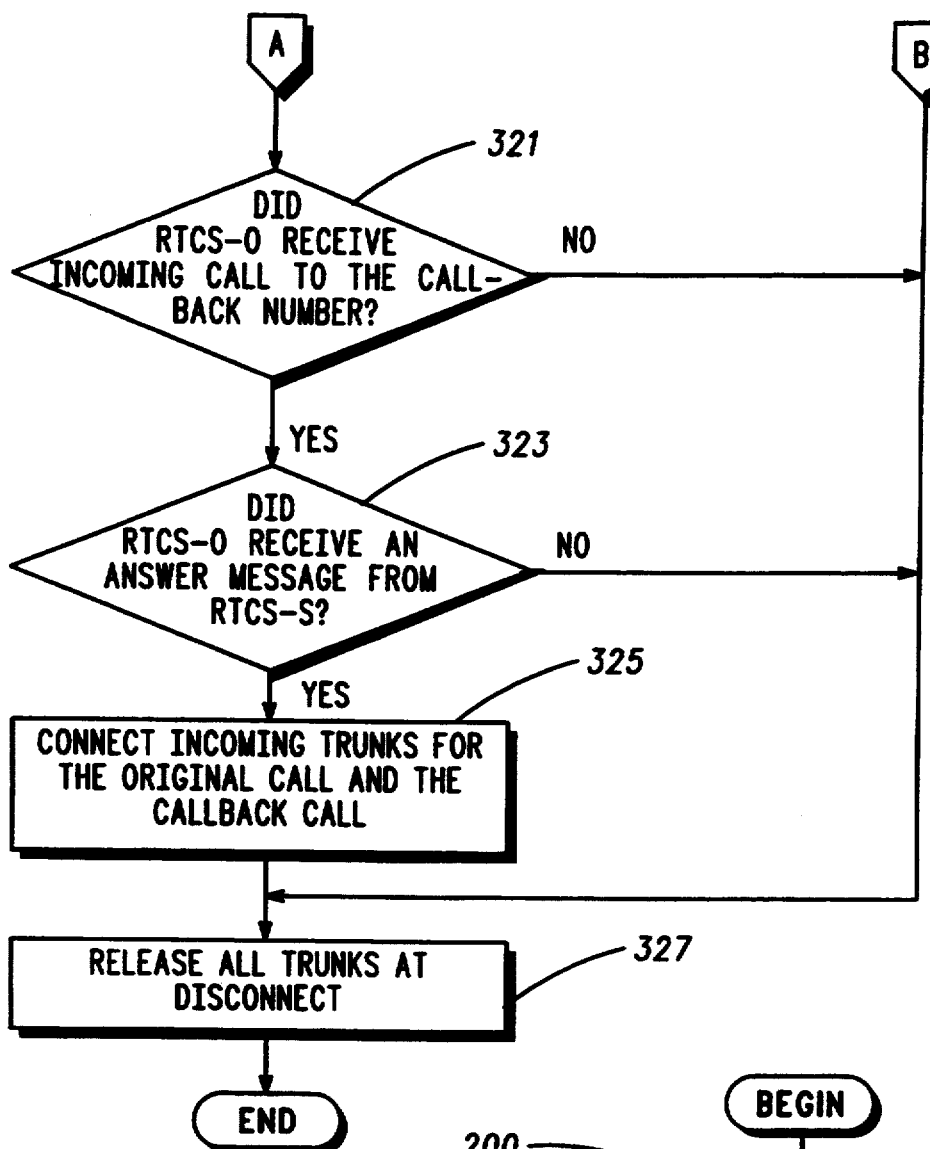
FIG. 3 is a flow chart diagram depicting the call delivery service of the present invention.
Figure 3A:
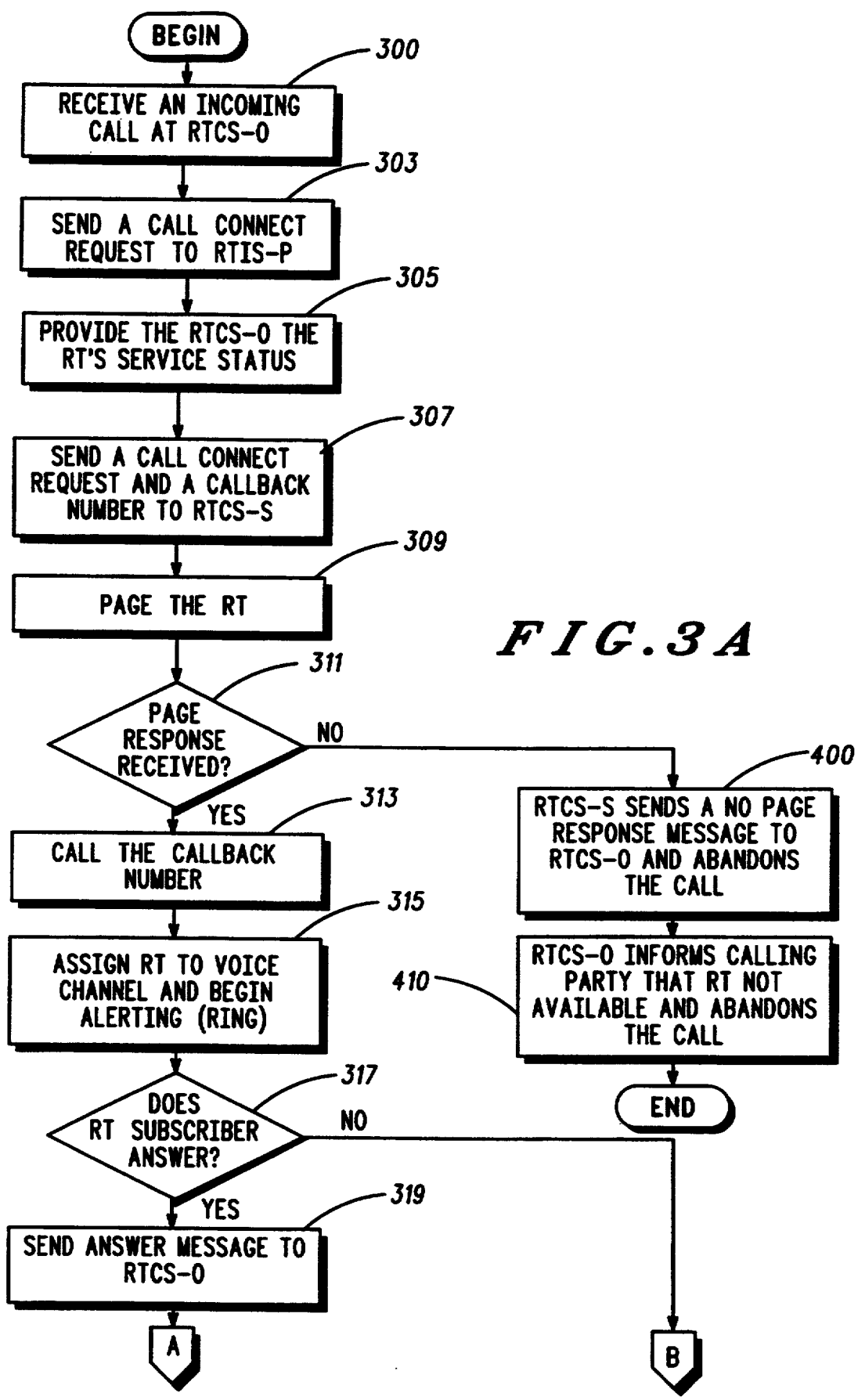

We can now direct our attention to FIG. 3, which is a flow chart diagram depicting the steps involved in the proposed call delivery service of the present invention. The flow chart begins at block 300, whenever a would-be caller, for example, caller 39, having no knowledge of the RT subscriber's 25 location, places a call to 212-888-4567. Following the prior convention, 212 is an area code which identifies, in this case, the NPA containing radio service area 2, 888 is an office code which identifies the RTCS 21, and 4567 is the RT subscriber's 25 station number. Since the incoming call enters the RTN at RTCS 21, RTCS 21 is termed the originating RTCS (RTCS-O). Thus, it will be appreciated that any RTN element may be termed originating (O) and/or currently servicing (S) depending upon its relationship to an incoming call and to an individual RT subscriber.

Proceeding to block 303, upon receipt of the incoming call at the RTCS-O, in this case RTCS 21, the RTCS-O will send a Call Connect Request to the RTIS-P, in this case RTIS 27, in order to ascertain the RT subscriber's 25 location within the RTN. At block 305, the RTIS-P will provide the RTCS-O the RT subscriber's updated service record and status. After receiving the updated service record from the RTIS-P, the RTCS-O, at block 307, will send a Call Connect Request, via the signalling network 100, to the currently servicing RTCS, RTCS 11, that a call placed to RT subscriber 25 is in progress. Along with the Call Connect Request, RTCS 11 will also receive a call back number, provided by RTCS 21.

At block 309, having been informed of the in-progress call, the currently servicing RTCS 11 will page the RT subscriber 25. Thereafter, at block 311, a check is performed to see if a page response is received. If it is not, flow proceeds to block 400 and 410, where the RTCS-S, RTCS 11, informs the RTCS-O, RTCS 21, via the signalling network 100, that no page response was received. The RTCS-S will then abandon the call without calling the callback number. At block 410, the RTCS-O informs the calling party that the RT subscriber 25 is not available and also abandons the call.

If a page response is received at block 311, flow proceeds to block 313 where the RTCS-S initiates a call to the callback number. Thereafter, at block 315 the RTCS-S assigns the RT subscriber a voice channel and sends an alerting signal to cause the RT subscriber's phone to ring.

At block 317, the RTCS-S then waits for the RT subscriber 25 to answer. If RT subscriber 25 answers, flow proceeds to block 319 where the RTCS-S will connect the assigned RF voice channel to the outgoing callback trunk and will send an "Answer" message to the RTCS-O, via signalling network 100, and will then await an answer supervision or disconnect signal via the outgoing callback trunk.

If RT subscriber 25 does not answer the alert, flow will branch to block 327, where the RTCS-S simply awaits a disconnect signal via the outgoing callback trunk.

Meanwhile, at blocks 321 and 323, the RTCS-O, RTCS 21, awaits receipt of the incoming call to the callback number and the Answer message from the RTCS-S, RTCS 11. Of importance, the callback number is a PSTN telephone number associated by the PSTN with RTCS-O and dynamically assigned by RTCS-O, in association with the incoming call to RT subscriber 25.

Upon receipt of both the incoming call to the callback number and of the Answer message from the RTCS-S, flow proceeds to block 325 where the RTCS-O, RTCS 21, will execute appropriate tasks necessary to connect the callback trunk to the trunk of the in progress call in order to connect the RT subscriber 25 to the in progress call, and to permit billing to begin.

If the incoming call to the callback number and the Answer message from the RTCS-S are not both received by the RTCS-O, then the call cannot be completed. The would-be caller 39 will eventually disconnect and, at block 327, the RTCS-S and the RTCS-O will release all trunks and the RF channel and return them to their idle state.

One advantage of the present approach towards call delivery is that the callback number is not called unless and until receipt of a page response from the target RT subscriber. This has the effect of postponing the dedication of those system resources required to connect the calls, until it is certain that the RT subscriber is accessible.

Typical call forwarding schemes suffer from the disadvantage that PSTN trunks are established and dedicated to the forwarding of the in progress call, prior to acknowledging the presence or the availability of the targeted RT subscriber. For an example, refer to U.S. Pat. No. 4,901,340. Such schemes are inherently wasteful in that they allocate costly communication resources, prior to determining the roaming subscriber accessibility. The present invention operates to eliminate this waste.

If it becomes necessary to shorten call set-up times, however, it will be appreciated that a currently serving RTCS need not wait until the page response is received before initiating the outgoing call to the callback number. This added flexibility allows RTN operators to overlap in time the paging and PSTN callback processes which may result in a time savings.

What is claimed is:

1. Within a radio telephone network (RTN) , a method for enabling an RT subscriber, in a radio service area serviced by a radio telephone control system (RTCS), to receive calls originally presented to a non-serving RTCS, comprising the steps of:

receiving, at a currently serving RTCS, request information, from an RT subscriber, indicating that the RT subscriber desires to receive, in the current radio service area, calls originally presented to non-serving RTCSs;

sending the request information to a radio telephone information store (RTIS) having service records for the RT subscriber;

updating the RTIS service recores for said RT subscriber as a function of the received request information;

receiving at the non-serving TRCS an incoming call, placed to the RT subscriber;

said non-serving RTCS generating and sending a first call connect request to the RTIS having service records for the RT subscriber;

said RTIS communicating the RT subscriber's updated service records to the non-serving RTCS upon receipt of the first call connect request:

said non-serving RTCS generating and sending a second call connect request to the currently serving RTCS, said second call connect request comprising service information and a callback number;

receiving, at the currently serving RTCS, the service information and the callback number from the non-serving RTCS indicating that an incoming call, placed to the RT subscriber, is in progress at the non-serving RTCS;

the currently serving RTCS paging the RT subscriber; and upon receipt of the RT subscriber's page response, the currently serving RTCS calling the callback number so as to connect the RT subscriber to the incoming call.

2. The method of claim 1 wherein the step of sending the RT subscriber's request information is performed by the currently serving RTCS.

3. The method of claim 1 wherein the RTIS is a data base maintaining RT subscriber service information.

4. The method according to claim 1 wherein RT subscriber service information comprises at least one of:
RT identification;
RT privileges; .
RT restrictions;
RT service features;
service feature status; or
the currently serving RTCS identification.

5. The method of claim 1 wherein the currently serving RTCS does not call the callback number until receipt of the RT subscriber's page response.

6. The method of claim 1 wherein the non-serving RTCS is any RTCS within the RTN, not currently providing the RT subscriber with radio coverage and which provides incoming call entry into the RTN.

* * * * *